United States Patent
Lin et al.

(10) Patent No.: US 9,699,115 B2
(45) Date of Patent: Jul. 4, 2017

(54) BUS NETWORK HAVING A SAFETY GATE OF A SUBSTANTIAL SAFETY ISOLATION TYPE

(71) Applicants: Mettler-Toledo (Changzhou) Precision Instrument Ltd., Changzhou (CN); Mettler-Toledo (Changzhou) Measurement Technology Ltd., Changzhou (CN); Mettler-Toledo (Changzhou) Scale & System Ltd., Changzhou (CN)

(72) Inventors: Zhitie Lin, Changzhou (CN); Ying Zhang, Changzhou (CN); Yangjie Xu, Changzhou (CN)

(73) Assignees: METTLER TOLEDO (CHANGZHOU) PRECISION INSTRUMENT LTD., Jiangsu (CN); METTLER TOLEDO (CHANGZHOU) MEASUREMENT TECHNOLOGY LTD., Jiangsu (CN); METTLER TOLEDO (CHANGZHOU) SCALE & SYSTEM LTD., Jiangsu (CN)

(*) Notice: Subject to any disclaimer, the term of this patent is extended or adjusted under 35 U.S.C. 154(b) by 0 days.

(21) Appl. No.: 14/780,479

(22) PCT Filed: Mar. 27, 2014

(86) PCT No.: PCT/CN2014/074177
§ 371 (c)(1),
(2) Date: Sep. 25, 2015

(87) PCT Pub. No.: WO2014/154157
PCT Pub. Date: Oct. 2, 2014

(65) Prior Publication Data
US 2016/0080289 A1    Mar. 17, 2016

(30) Foreign Application Priority Data

Mar. 27, 2013  (CN) .......................... 2013 1 0103496

(51) Int. Cl.
*H04L 12/933*  (2013.01)
*H04L 12/64*   (2006.01)

(52) U.S. Cl.
CPC .......... *H04L 49/15* (2013.01); *H04L 12/6418* (2013.01)

(58) Field of Classification Search
CPC ........................... H04L 49/15; H04L 12/6418
USPC ......................................................... 370/402
See application file for complete search history.

*Primary Examiner* — Ronald B Abelson
(74) *Attorney, Agent, or Firm* — Standley Law Group LLP

(57) ABSTRACT

The present invention relate to a bus network having a safety gate of a substantial safety isolation type. The bus network comprises a first region, a second region, and signal isolators. The first region has disposed therein a first bus and has distributed therein one or more first processing devices, one or more first transceivers, one or more first controllers, and one or more gateways. The second region has disposed therein a second bus and has distributed therein one or more second processing devices and one or more second transceivers. The signal isolators are disposed between the first region and the second region. An isolation device driving terminal and an output terminal on one side of the signal isolator are respectively connected to a transmitting terminal and a receiving terminal of a second controller. An output terminal and an isolation device driving terminal on the other side of the signal isolator are respectively connected to a transmitting terminal and a receiving terminal of a second transceiver.

8 Claims, 1 Drawing Sheet

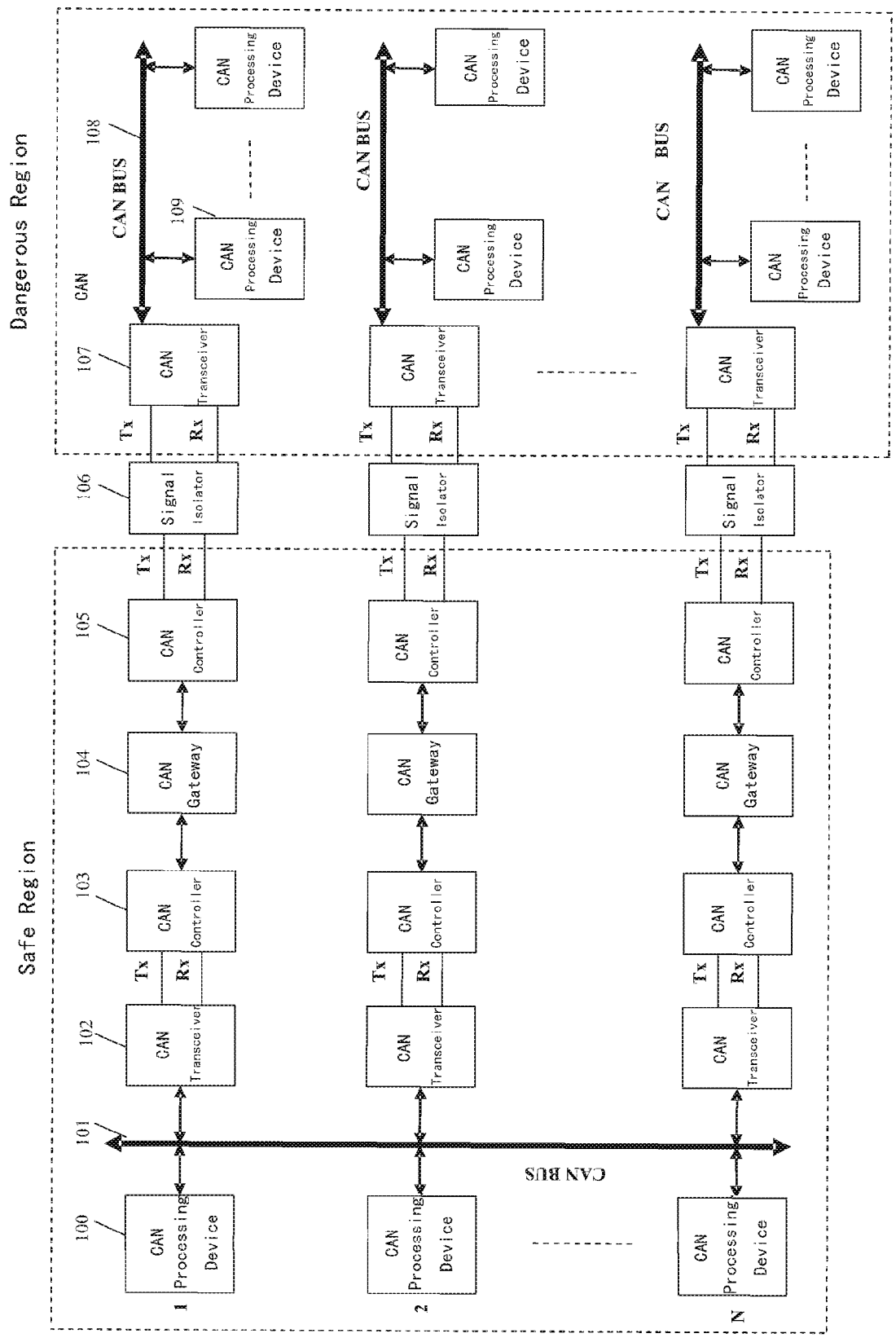

BUS NETWORK HAVING A SAFETY GATE OF A SUBSTANTIAL SAFETY ISOLATION TYPE

BACKGROUND OF THE INVENTION

1. Field of the Invention

The present invention relates to explosion proof technologies, and more particularly to a CAN bus network and an industrial Ethernet having a safety gate of a substantial safety isolation type.

2. The Related Art

Industrial buses are critical for automatically controlling information exchange. In industrial buses, Controller Area Network (CAN) buses and industrial Ethernet are widely used. Since CAN buses and industrial Ethernet are reliable for communication and are convenient in topology implementations, they become preferred schemes for network protocol of digital systems.

In some special technical field, CAN buses and industrial Ethernet may be applied in dangerous inflammable and explosive situations. Due to the requirements of explosion proof standard, CAN and industrial Ethernet signals in a dangerous region are not allowed to be in direct communication with CAN and industrial Ethernet signals in a safe region, but shall experience voltage tolerance isolation or explosion proof technical processing before communicating signals from different regions.

Due to communication bus conflict detection of CAN BUS and industrial Ethernet signals, however, listening is constantly going on. If CAN BUS and industrial Ethernet in the safe region and CAN BUS and industrial Ethernet in the dangerous region, after being isolated, directly superimpose on a same communication physical medium, the CAN BUS and the industrial Ethernet would be deadlocked due to poor communication.

SUMMARY

The technical problem to be solved by the present invention is to provide a CAN Bus network and an industrial Ethernet having a safety gate of an isolation type so that CAN signals and industrial Ethernet from a dangerous regions may still be in communication with CAN signals and industrial Ethernet from a safe region even they have gone through isolated intrinsic safety and explosion proof processing. In other words, the dangerous region and the safe region may still communication as if they are in the same network. Taking the following CAN BUS as an example:

To solve the above technical problem, the technical solution of the present invention provides a bus network having a safety gate of a substantial safety isolation type that comprises a first region, a second region, and optoelectronic isolators. The first region has disposed therein a first CAN bus and has distributed therein one or more first CAN processing devices, one or more first CAN transceivers, one or more first CAN controllers, one or more CAN gateways, and one or more second CAN controllers. A CAN signal terminal of a respective first CAN processing device is connected to the first CAN bus. The first CAN bus is connected to a CAN signal terminal of a respective first CAN transceiver. A transmitting terminal and a receiving terminal of a respective first CAN transceiver are respectively connected to a transmitting terminal and a receiving terminal of a respective first CAN controller. Control signal terminals of the first CAN controller are respectively connected to respective control signal terminals of a respective CAN gateway. Respective control signal terminals of a respective CAN gateway are respectively connected to respective control signal terminals of a respective second CAN controller. The second region has disposed therein a second CAN bus and has distributed therein one or more second CAN processing devices and one or more second CAN transceivers. A CAN signal terminal of a respective second CAN transceiver is connected to the second CAN bus. A CAN signal terminal of a respective second CAN processing device is connected to the second CAN bus. The optoelectronic isolators are disposed between the first region and the second region. An isolation device driving terminal and an output terminal on one side of a respective optoelectronic isolator are respectively connected to the transmitting terminal and the receiving terminal of a respective second CAN controller. An output terminal and an isolation device driving terminal on the other side of a respective optoelectronic isolator are respectively connected to the transmitting terminal and the receiving terminal of a respective second CAN transceiver.

In an embodiment of the present invention, there are one or more first regions.

In an embodiment of the present invention, there are one or more second regions.

In an embodiment of the present invention, the optoelectronic devices of the optoelectronic isolator are light emitting diodes.

In an embodiment of the present invention, the CAN gateway of the CAN bus network comprises processors for processing signals from the first CAN controller and signals from the second CAN controller, respectively.

By utilizing the above technical solution of the present invention, an optoelectronic isolator is used to isolate the CAN bus in the first region from the CAN bus in the second region. Two sets of CAN BUS signals from different regions are processed by processor(s) in the CAN gateway, where signals from one part are processed and then transmitted to the other part so as to achieve signal coupling therebetween. In this manner, CAN BUS signals from different regions seem to communicate on a same physical medium and isolated communication is achieved.

BRIEF DESCRIPTION OF THE DRAWINGS

So that the above purpose, features, and advantages of the present invention may be readily understood, detailed description of the embodiments of the present invention are given below in connection with accompanying drawings, in which:

FIG. 1 is circuit principle diagram of a CAN bus network having a safety gate of an isolation type according to an embodiment of the present invention.

DETAILED DESCRIPTION OF EMBODIMENTS

FIG. 1 is circuit principle diagram of a CAN bus network having a safety gate of an isolation type according to an embodiment of the present invention. As shown in FIG. 1, the CAN bus network is divided into a first region and a second region. The first region is usually defined as a safe region, while the second region is usually defined as a dangerous region. In other words, a safe region means a region having no or very little risk of explosion, while a dangerous region means a region having a risk of explosion. The safe region and the dangerous region may be defined according to the environment where the CAN bus network is actually disposed. There may be one or more safe regions and one or more dangerous regions.

A first CAN bus, i.e., CAN BUS 101, is disposed in the safe region. The safe region also has disposed therein a first CAN processing device 100, a first CAN transceiver 102, a first CAN controller 103, a CAN gateway 104, a second CAN controller 105, etc. A CAN signal terminal of the first CAN processing device 100 is connected to the CAN BUS 101 disposed in the safe region. The CAN BUS 101 disposed in the safe region is connected to a CAN signal terminal of the first CAN transceiver 102. A transmitting terminal (Tx terminal) and a receiving terminal (Rx terminal) of the first CAN transceiver 102 are connected to the Tx terminal and Rx terminal of the first CAN controller 103, respectively. Control signal terminals of the first CAN controller 103 are connected to corresponding control signal terminals of the CAN gateway 104. Control signal terminals of the CAN gateway 104 are connected to corresponding control signal terminals of the second CAN controller 105.

In the present embodiment, there may be one or more first CAN processing devices 100, one or more first CAN transceivers 102, one or more first CAN controllers 103, one or more CAN gateways 104, and one or more second CAN controllers 105. For example, the first CAN processing devices 100 may have numberings of 1-N. Accordingly, the first CAN transceiver 102, the first CAN controller 103, the CAN gateway 104, and the second CAN controller 105 may comprise devices of similar numberings.

In the present embodiment, a signal isolator 106 is used at a boundary of the safe region to isolate the safe region and the dangerous region. The Tx terminal and Rx terminal of the second CAN controller 105 are connected to a isolation device driving terminal and an output terminal to the left of the signal isolator 106, respectively.

A second CAN bus, i.e., CAN BUS 108, is disposed in the dangerous region. The dangerous region also has disposed therein a second CAN transceiver 107 and a second CAN processing device 109. A CAN signal terminal of the second CAN transceiver 107 is connected to the CAN BUS 108 in the dangerous region. A CAN signal terminal of the second CAN processing device 109 is connected to the CAN BUS 108 in the dangerous region. Besides, an output terminal and an isolation device driving terminal to the right of the signal isolator 106 are connected to the Tx terminal and Rx terminal of the second CAN transceiver 107, respectively.

In an embodiment of the present invention, optoelectronic devices in the signal isolator are light emitting diodes. In other embodiments of the present invention, the signal isolator may be any one of a magnetic coupling isolator, a capacitive type isolator, an optical fiber isolator, or a transformer isolator.

In the present embodiment, there may be one or more second CAN buses, i.e., CAN BUS 108. Accordingly, there may be one or more second CAN transceivers 107 and one or more second CAN processing devices 109. For example, the CAN BUS 108 may have numberings of 1-N. Accordingly, the second CAN transceivers 107 and the second CAN processing devices 109 may comprise devices of similar numberings.

During signal processing, signals from the CAN BUS 101 in the safe region are transmitted to the CAN gateway 104. Processor(s) in the CAN gateway 104 process the signals and transmit the same to the CAN BUS 108 in the dangerous region. On the other hand, signals from the CAN BUS 108 in the dangerous region are transmitted to the CAN gateway 104. Processor(s) in the CAN gateway 104 process the signals and transmit the same to the CAN BUS 101 in the safe region.

The safety gate of a CAN bus isolation type is characterized in that the CAN BUS in the safe region is isolated from the CAN BUS in the dangerous region. Two sets of CAN BUS signals from different regions are processed by processor(s) in the CAN gateway 104, where signals from one part are processed and then transmitted to the other part so as to achieve signal coupling therebetween. In this manner, CAN BUS signals from different regions seem to communicate on a same physical medium.

While the present invention has been described in connection with specific embodiments, those skilled in the art may readily understand that the above embodiments are merely used to illustrate the present invention and may have various equivalent variations or replacements without departing from the spirit of the present invention. Therefore, all the variations and modifications to the above embodiments within the substantial spirit scope of the present invention fall within the scope of the claims of the present invention.

What is claimed is:

1. A bus network having a safety gate of a substantial safety isolation type, comprising:
   a first region having disposed therein a first bus and having distributed therein one or more first processing devices, one or more first transceivers, one or more first controllers, one or more gateways, and one or more second controllers, wherein a signal terminal of the first processing device is connected to the first bus, the first bus is connected to a signal terminal of the first transceiver, a transmitting terminal and a receiving terminal of a respective first transceiver are respectively connected to a transmitting terminal and a receiving terminal of a respective first controller, control signal terminals of a respective first controller are respectively connected to respective control signal terminals of a respective gateway, respective control signal terminals of a respective gateway are respectively connected to respective control signal terminals of a respective second controller;
   a second region having disposed therein a second bus and having distributed therein one or more second processing devices and one or more second transceivers, wherein a signal terminal of a respective second transceiver is connected to the second bus, a signal terminal of a respective second processing device is connected to the second bus;
   a plurality of signal isolators disposed between the first region and the second region, wherein an isolation device driving terminal and an output terminal on one side of a respective signal isolator are respectively connected to a transmitting terminal and a receiving terminal of a respective second controller, an output terminal and an isolation device driving terminal on the other side of the signal isolator are respectively connected to a transmitting terminal and a receiving terminal of a respective second transceiver.

2. The bus network having a safety gate of a substantial safety isolation type as recited in claim 1, characterized in that there are one or more first regions.

3. The bus network having a safety gate of a substantial safety isolation type as recited in claim 1, characterized in that there are one or more second regions.

4. The bus network having a safety gate of a substantial safety isolation type as recited in claim 1, characterized in that the signal isolator is any one of the following isolators:
   an optoelectronic isolator, the optoelectronic devices of which are light emitting diodes;
   a magnetic coupling isolator;
   a capacitive type isolator;
   an optical fiber isolator; and
   a transformer isolator.

5. The bus network having a safety gate of a substantial safety isolation type as recited in claim 1, characterized in that the gateway comprises processors for processing signals from the first controller and signals from the second controller, respectively.

6. The bus network having a safety gate of a substantial safety isolation type as recited in claim 1, characterized in that the first controller and the second controller are included in the gateway.

7. The bus network having a safety gate of a substantial safety isolation type as recited in claim 1, characterized in that the bus network is a conflict detection bus network for intrinsic safety and explosion proof.

8. The bus network having a safety gate of a substantial safety isolation type as recited in claim 1, characterized in that the bus network is an industrial Ethernet network or a CAN BUS network.

* * * * *